United States Patent

Pouille et al.

[11] Patent Number: 5,868,880
[45] Date of Patent: Feb. 9, 1999

[54] PREVULCANIZED TIRE TREAD STRIP FOR RETREADING

[75] Inventors: Guy Pouille, Clermont-Ferrand; Bernard Ravel, Nohanent; Renaud Rivaton, Blanzat, all of France

[73] Assignee: Compagnie Generale des Etablissements Michelin-Michelin & Cie, Clermont-Ferrand, France

[21] Appl. No.: 755,005

[22] Filed: Nov. 22, 1996

[30] Foreign Application Priority Data

Nov. 30, 1995 [FR] France ..................... 95 14886

[51] Int. Cl.⁶ ..................... B60C 11/00; B29D 30/56
[52] U.S. Cl. ..................... 152/209 R; 156/96
[58] Field of Search ..................... 152/209 R, 175, 152/176, 177, 185.1, 187–189; 156/126, 127, 96, 129

[56] References Cited

U.S. PATENT DOCUMENTS

| | | |
|---|---|---|
| 1,198,634 | 9/1916 | Hensley ..................... 152/189 |
| 1,261,621 | 4/1918 | Richard ..................... 152/189 |
| 1,487,165 | 3/1924 | Jacobson ..................... 152/189 |
| 2,142,315 | 1/1939 | Hershey ..................... 152/189 |
| 2,157,004 | 5/1939 | Nelson, Sr. ..................... 152/189 |
| 2,524,551 | 10/1950 | Tolbert ..................... 152/175 |
| 3,815,651 | 6/1974 | Neal . |
| 4,098,936 | 7/1978 | Rawls . |
| 4,174,239 | 11/1979 | Symmes . |

FOREIGN PATENT DOCUMENTS

| | | |
|---|---|---|
| 0341187 | 11/1989 | European Pat. Off. . |
| 715150 | 11/1931 | France . |
| 2553719 | 4/1985 | France . |
| 1232845 | 1/1967 | Germany . |

Primary Examiner—Geoffrey L. Knable
Attorney, Agent, or Firm—Baker & Botts

[57] ABSTRACT

Prevulcanized tread strip (1, 10) including a cap (2) and two side wings (3, 20, 30), such that each lateral end of said wings (3, 20, 30) ends in a bead (4, 21, 31) made of elastomeric material with a substantial thickness in the region intended for connection to a tire carcass.

12 Claims, 3 Drawing Sheets

PREVULCANIZED TIRE TREAD STRIP FOR RETREADING

BACKGROUND OF THE INVENTION

The present invention relates to a prevulcanized tire tread strip for retreading and, more particularly, to the profile of the edges of the tread strip. The invention also relates to a tire obtained using this tread strip.

It is known that a tire consists of a flexible carcass which is roughly in the shape of a torus open on the axis side, and of a thicker tread strip which surrounds the periphery of the carcass and provides contact between the tire and the ground. The tread strip is subjected to more rapid wear than the carcass and reconstructing the tread strip when it is worn is less expensive than replacing the tire.

This reconstruction, known as retreading in the more general case in which it applies to the tread strip alone, calls upon several types of product and method; thus, the new tread strip may be raw or prevulcanized:

- in the former case, the new tread strip, which is raw, and applied to the carcass beforehand, is vulcanized in a mold similar to the one used to manufacture the new tire;
- in the latter case, known as "cold" retreading, the prevulcanized tread strip is applied to the carcass, with the interposition of a layer of vulcanizable binding gum; the assembly is then usually surrounded, in whole or in part, by a leakproof membrane placed under pressure inside an autoclave to vulcanize the binding gum; the purpose of this membrane is to guarantee even application of a pressure of several bars, especially in the critical region of binding between the tread strip and the carcass throughout or during some of the vulcanizing operation.

The present invention relates to this latter type of retreading.

The prevulcanized tread strip may be in one of a number of forms, for example, either very long and flat or preformed transversely curved strips, which are cut to the desired length at the time of retreading, or prepared rings of a given length:

- flat strips allow simple, reliable and effective retreading, but exhibit a number of drawbacks: reduction in the width of the tread strip by comparison with that of the new tire, mediocre appearance and the emergence of cracks during running;
- strips with "flaps" are provided along the sides with tapering extensions, which are also known as "wings", intended to envelop (in full or in part) the shoulders of the tire; in this way the final appearance of the retreaded tire is improved, but these strips display a serious drawback: during running, cracks emerge in the region of connection of the tread strip to the carcass, and these cracks spread dangerously, causing detachment of the tread strip or deep breaks in the carcass;
- the rings allow better application to the carcass and avoid the joining-together of the two ends of the tread strip, but they require more sophisticated means of fitting and do not prevent cracks from appearing in the connection region.

Attempts at avoiding the appearance of cracks have been made by proposing the most tapered possible tread strip wings (EP 495 048, page 6, line 14) or by distributing the tensions in the region where the tread strip connects with the carcass, for example, by cutting circumferential grooves on the exterior sides of the tread strip (JP 6/191225). This last solution has reduced the flexural rigidity of the wings and thus has made them easier to apply to the shoulders of the carcasses of tires but has not lead to any significant reduction in cracking in the critical region of connection to the carcass.

Attempts have also been made to improve the quality of the bond between the tread strip and the carcass in this critical region after it was observed that the binding gum arranged between the carcass and the tread strip could run during vulcanizing until it covered part of the exterior surface of the wing of the tread strip, which part is not prepared for adhering securely to this binding gum. For example, U.S. Pat. No. 5,313,745 proposes to grind the two edges, interior and exterior, of the wings of the tread strips in order to improve their bonding to the binding gum. This solution substantially improved the resistance to cracking of the critical region, but this problem of cracks remains and hampers the development of the cold-retreading technique, even though this technique is very attractive in other respects.

SUMMARY OF THE INVENTION

The object of the present invention is to improve the quality and reliability of the bond between the tread strip and the carcass in the two circumferential regions of connection of the edges of the tread strip to the carcass.

As used herein:

"prevulcanized tread strip" is understood to be a tread strip which has already undergone a vulcanizing cycle, whether this cycle led to complete or to partial vulcanization;

"carcass" is understood to be a tire without the tread strip, whether this tire is a new tire or a worn tire.

According to the invention, a prevulcanized tread strip includes a cap and two side wings with a base, the transverse profile of which is flat or concave and an exterior surface, each side wing having, starting from the cap, a progressively tapering region followed by a bead consisting exclusively of elastomeric material so that the transverse profile of the lateral end of said bead is convex and diverges progressively from the flat or concave transverse profile of the base in such a way that at a point B of said profile of the lateral end of the bead, the tangent of which is perpendicular to the tangent of the lateral end of the profile of the base, the distance separating said point B from said tangent of the lateral end of the profile of the base is greater than or equal to the minimum thickness of the wing in the progressively tapering region.

Advantageously, the bead is adjacent a longitudinal groove, and the bead and the groove are dimensioned to produce a disconnection between the bead and the body of the wing lying between the cap and the groove so as to isolate said bead from the loads exerted on the body of the wing.

As a preference, the minimum thickness of the wing is at the longitudinal groove and the maximum thickness of the bead is greater than or equal to twice the minimum thickness of the wing. This minimum thickness is advantageously less than 3 mm.

Thus, contrary to what is practiced by those skilled in the art endeavoring to give the retreaded tire the same profile as the new tire, it has been observed that by replacing the progressively tapered connection part of the wing of the tread strip with a groove followed by a bead with substantial thickness in the region for connection between the tread strip and the carcass, the mechanical stresses on the connection region are very markedly reduced and the resistance to cracking of the critical region is thus considerably improved.

The presence of the bead also has the advantage of guaranteeing that the pressures for forming a joinder between the lateral ends of the wings and the carcass are high and reproducible throughout the vulcanization phase in the autoclave, and this improves the quality and reliability of the bond in the critical region.

In a first embodiment, the lateral end of the bead has a transverse profile in the form of a semicircle of radius greater than or equal to the minimum thickness of the wing.

In a second embodiment of the invention, the lateral end of the bead has a convex, substantially straight, transverse profile and forms, with the transverse profile of the lateral end of the base, an angle α which measures between 90° and 140° and preferably between 110° and 130°.

According to an additional feature, the transverse profile of the exterior surface of the tread strip at the bead is substantially straight and forms, with the substantially straight profile of the lateral end of the bead, an angle β which measures less than or substantially 90°.

The geometry of the bead according to the invention, and especially in these two embodiments of the invention, has the advantage of very precisely defining the extent to which the binding gum will run. In effect, the cavity provided for this running is delimited by the lateral end of the bead, the membrane which presses against the exterior surface of the wing, and the profile of the carcass beyond the connection region. The pressure applied to the membrane during vulcanization is such that the binding gum cannot penetrate between the membrane and the exterior surface of the bead beyond the cavity provided. These solutions therefore lead to the presence of a line of binding gum which is clearly delimited at the exterior surface of the retreaded tire, which gives this tire a very pleasing appearance.

DESCRIPTION OF THE DRAWINGS

Embodiments of the invention, without implied limitation, will be described with reference to the attached drawings, in which.

DESCRIPTION OF PREFERRED EMBODIMENTS

Figure 1:
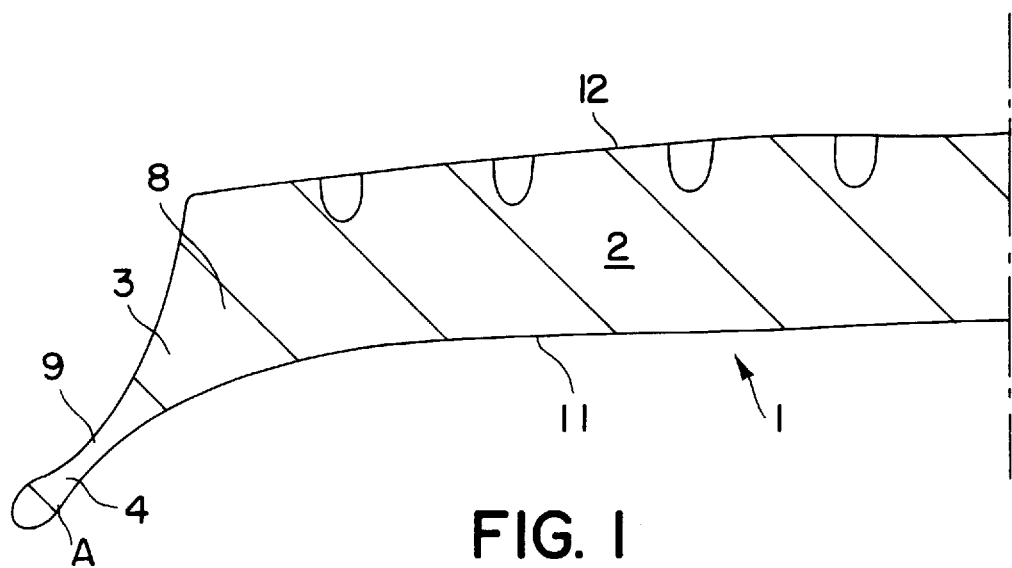
FIG. 1 is a transverse half section through a prevulcanized ring-shaped tread strip in accordance with the invention.

FIG. 1 shows a transverse half section of a prevulcanized ring-shaped tread strip 1 including a thick middle part known as the cap 2 and a thinner lateral part 3 known as a "flap" or "wing". The wing 3 comprises a progressively tapering region 8 followed laterally by a bead 4. This tread strip 1 also has a base 11 intended to be applied against the exterior surface 16 of a tire carcass 5 with the interposition of a vulcanizable binding gum 6. This base 11 ends laterally at a ridge A where, after application to the carcass, the profile of the wing 3 diverges from the profile of the carcass 5. The base 11, at the cap 2, is intended to be pressed against the cap of the carcass of the tire and, at the wing, to be pressed against the shoulder and possibly against the top of the sidewalls of the carcass. The tread strip 1 also comprises an exterior surface 12 intended, after it has been applied to a tire carcass, to constitute the exterior surface of the tire. The tread strip section shown is a transversely curved flat strip. The invention also applies to flat strips in which the base has a completely flat transverse profile (see FIGS. 4 and 5).

The present invention relates to the profile of the bead 4 of the wing 3, which will be described in greater detail with reference to FIGS. 2, 3 and 5.

Figure 2:
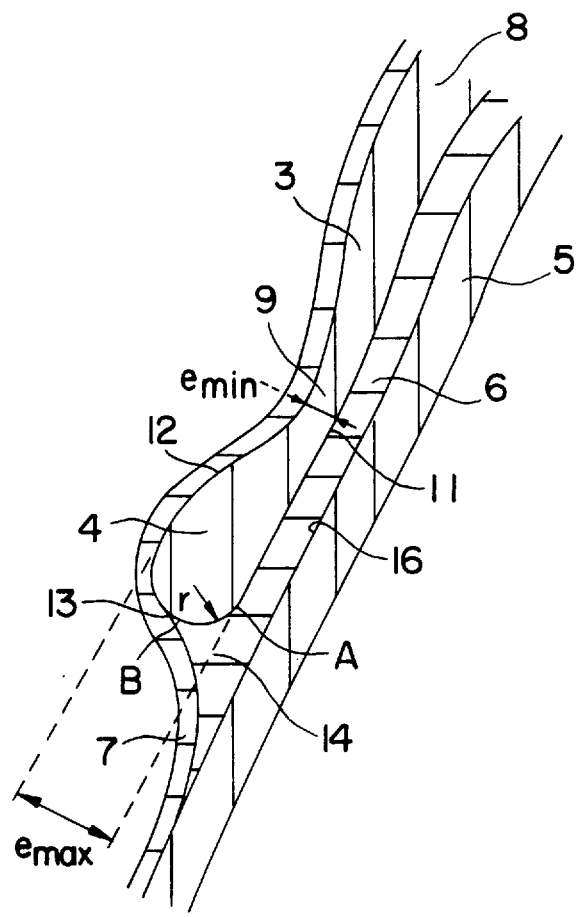
FIG. 2 is a view in transverse section on an enlarged scale of a first embodiment of the edge of the wing of the tread strip of FIG. 1 after it has been applied to the carcass.

FIG. 2 shows the bead 4 of the wing 3 of the tread strip 1 after it has been applied to a carcass 5; a layer of binding gum 6 has been interposed between the carcass and the tread strip 1 in order to ensure that they adhere together after this binding gum 6 has been vulcanized, for example, in an autoclave.

Prior to this vulcanization and after the tread strip 1 has been assembled on the carcass 5, a flexible membrane 7 which covers the exterior profile of the assembly is placed around this assembly and then the whole assembly thus prepared is placed in an autoclave in which the interior pressure is brought up to 5 or 6 bars (500 or 600 kPa), and the temperature to approximately 115° C. for a duration of the order of two hours. The membrane 7 is fixed in a leakproof manner in such a way that a relative vacuum can be set up between the membrane and the tire, forcing the former to match the exterior profile of the assembly perfectly and ensure a high effective pressure with which the tread strip 1 is pressed against the carcass 5 throughout the duration of the vulcanization, especially in the critical region of connection.

Figure 5A:
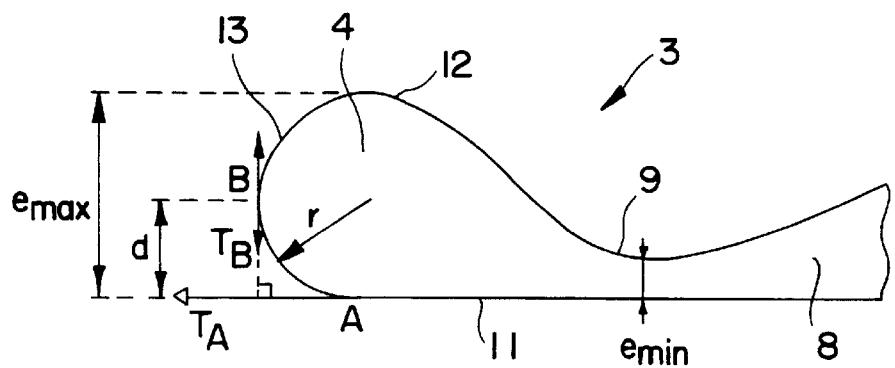
FIGS. 5(a) and 5(b) are enlarged sections through the first and second embodiments of tread strip wing beads.

According to the invention, it may be seen in FIGS. 1, 2 and 5(a) that the profile of the wing 3 of the tread strip 1 comprises, in succession, starting from the cap 2, a progressively tapering region 8, a circumferential groove 9 of minimum thickness $e_{min}$, then a circumferential bead 4. As a preference, the maximum thickness $e_{max}$ of the bead 4 is at least equal to twice the minimum thickness of the wing 3 at the circumferential groove 9. The minimum thickness $e_{min}$ is less than 3 mm, of the order of 1 to 2 mm or even, if possible, less.

The circumferential groove 9 is thus a means of mechanical isolation which, on account of the thickness of the bead 4, is very effective and effectively allows the crack-causing tensile stresses experienced during running at the region of connection between the wing 3 and the carcass 5 to be limited. As a preference, this isolation means is a single circumferential groove 9 of very rounded profile. The radius of this groove may thus advantageously be greater than 5 times the minimum thickness of the wing.

In the embodiment of FIGS. 2 and 5(a), the bead 4 has a cross-section, the lateral end 13 of which has a rounded convex shape. The point B corresponds to the point on the transverse profile of the lateral end 13 of the bead 4, the tangent $T_B$ of which is perpendicular to the tangent $T_A$ of the lateral end A of the profile of the base 11. The distance d separating B from this tangent $T_A$ has to be greater than or equal to the minimum thickness of the wing at the longitudinal groove 9. This bead according to the invention therefore has a substantial thickness in the region of connection between the carcass and the tread strip.

Here, the profile of the lateral end is substantially in the shape of a semicircle. Moreover, the radius r of this semicircle is appreciably greater than the minimum thickness $e_{min}$ of the groove 9.

The lateral end 13 of the bead 4, the exterior profile of the carcass 5 and the base of the membrane 7 define a cavity 14 which during vulcanization is filled with the binding gum 6 which is rendered fluid by the heat. Owing to the pressure applied by the membrane 7 to the bead 4, the binding gum 6 cannot ingress between the membrane 7 and the bead 4, and the region in which the binding gum 6 runs is therefore well controlled and gives rise to a connecting region which is very pleasing after the membrane 7 has been removed.

Figure 3:
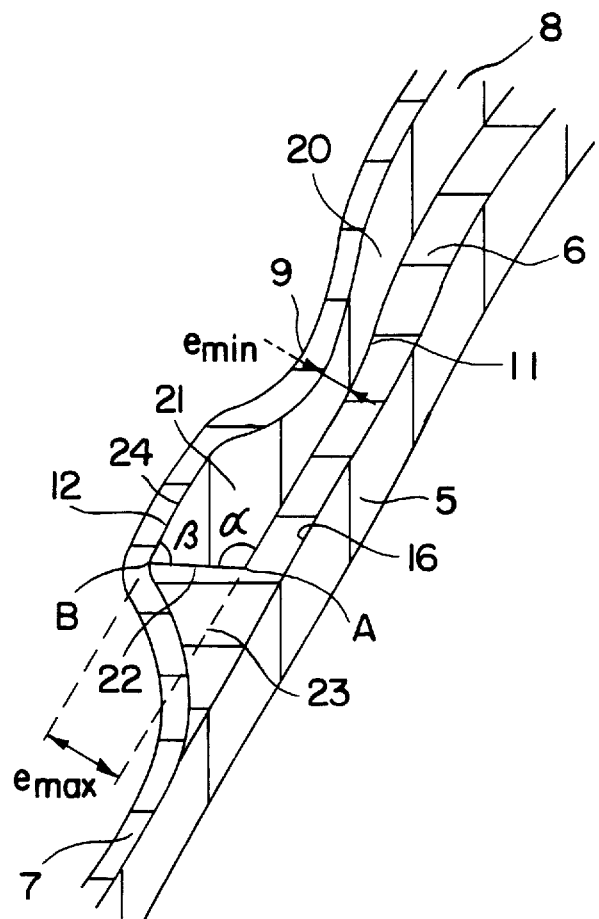
FIG. 3 is a view similar to FIG. 2 of a second embodiment of the edge of the wing of the tread strip of FIG. 1.
Figure 5B:
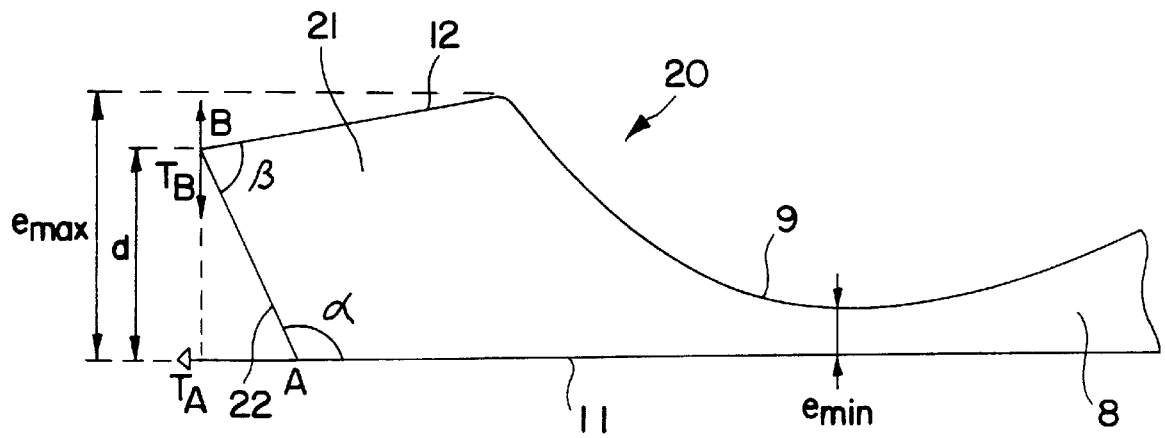

FIGS. 3 and 5(b) show a second embodiment of a wing 20 according to the invention. In this case, the wing as before comprises a mechanical-isolation groove 9 followed by a bead 21. The lateral end 22 of the bead 21 connects at A to the base 11 and at B to the exterior surface 12 of the tread strip. This lateral end 22 has a substantially straight transverse profile between the points A and B, at A forming, with the transverse profile of the lateral end of the base 11 of the bead 21, an angle $\alpha$ which measures between 90° and 140° and preferably between 110° and 130°. Within this range of preferred values, this angle favors a reproducible application pressure transmitted by the membrane 7 to the region of connection between the carcass and the tread strip, around A, throughout the time the carcass and tread strip assembly spends in the autoclave. The transverse profile of the exterior surface 12 of the tread strip at the bead 21 in this example is substantially straight and forms, at B, with the lateral end 22 of the bead, an angle $\beta$ measuring 90° or less. This transverse profile of the exterior surface at the bead here is substantially parallel to the base 11. This means that there is a high pressure pressing the membrane 7 against the exterior surface 12 at the bead 21 as far as the ridge B and thus particularly precise definition of the region of connection between the binding gum 6 after it has run during vulcanization and the bead 21. This straight-line segment 22 thus forms a sort of cliff where the binding gum 6 can run freely without being able to infiltrate beyond. As before, this gives the region of connection between the wing 20 of the tread strip and the carcass 5 a considerably pleasing appearance.

In accordance with the invention, the distance d separating B from the tangent $T_A$ of the profile of the lateral end of the base 11 at A is appreciably greater than the minimum thickness of the wing $e_{min}$ and the maximum thickness $e_{max}$ of the bead 21 is more than twice this minimum thickness $e_{min}$.

These two less delicate geometries of wings 3, 20 also mean that the tread strips according to the invention are far easier to handle during all the operations of manufacture and assembly than are tread strips with tapering wings. In addition, the preparations of the base and of the lateral end of the beads 4, 21 for good bonding with the binding gum are also made easier. These preparations may, for example, be achieved by brushing or grinding.

Figure 4:
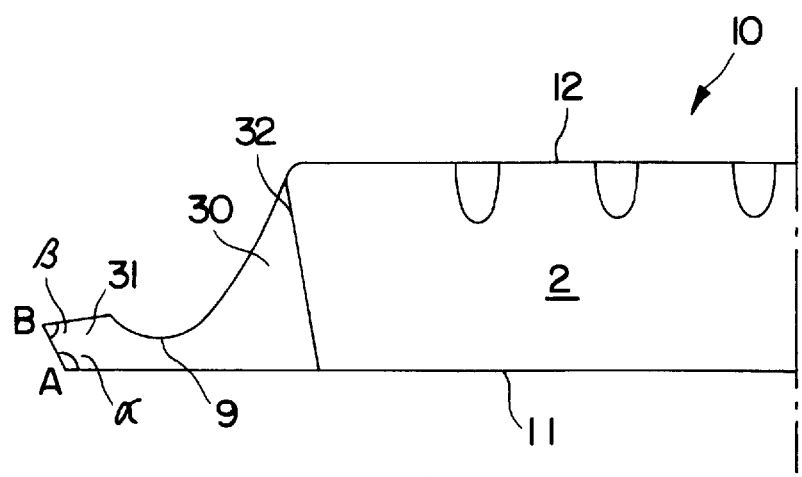
FIG. 4 shows a flat tread strip with flaps made of two materials.

FIG. 4 shows a flat tread strip 10 with flap according to the invention, made of two different elastomeric materials. Again we see the isolating groove 9 and the bead 31 which have geometries similar to those of FIG. 3. The cap 2 as before is made of an elastomeric material usually employed to form tread strips. By contrast, the wings 30 are made of an elastomeric material of a composition and hardness which are similar to those of the exterior sidewalls of tires. The surface 32 of demarcation between the two materials is situated substantially at the region of connection between the wings and the cap. The consequence of this is that the mechanical rigidity of the wings 30 is reduced as are the stresses experienced by the critical region of connection between the lateral end of the wings and the carcass and the resistance to cracking is further improved.

This solution may, of course, be applied to all types of prevulcanized tread strip.

In tests conducted with tires of dimensions 275/70 R 22.5 and 315/70 R 22.5 (heavy load tires) which had been retreaded with prevulcanized tread strips including, respectively, tapering wings of a known type, and wings including a bead according to the invention. These tests demonstrated a very substantial improvement in resistance to cracking in the critical region of connection between the tread strip and the carcass and thus an important increase in fatigue life for the retreaded tire.

The retreading method described earlier comprises the use of a flexible membrane during the vulcanizing phase. It is also possible not to use any leakproof membrane. In such cases we then speak of "membraneless" vulcanization. This method is trickier than the previous one and requires special provisions to be made during the assembly of the tread strips and of the carcass in order to guarantee leakproofing in the critical region of connection but has the advantage of being less expensive. The new geometry of tread strips according to the invention also gives excellent results with this membraneless method even though there is less control over the extent to which the binding gum runs.

The tread strips according to the invention may also, of course, be used to produce new tires from new vulcanized carcasses.

We claim:

1. A prevulcanized tread strip intended to be bonded to the wall of the carcass of a tire and including a cap and two side wings with a base, the transverse profile of which is flat or concave, and an exterior surface, each side wing having, starting from the cap, a region which progressively tapers to a minimum wing thickness followed by a bead consisting of elastomeric material, wherein the transverse profile includes a point A being the extreme lateral end of the base and a point B being the extreme lateral end of the bead, the point B extending beyond the point A in the direction of the carcass and the surface of the bead between the points A and B defining a surface of a cavity for the material which bonds the bead to the carcass, in which the distance between B and a tangent to the base at A is greater than or equal to the minimum thickness of the wing in the progressively tapering region.

2. A prevulcanized tread strip as set forth in claim 1, wherein the region of connection between the progressively tapering wing and the bead in at least one wing includes a longitudinal groove.

3. A prevulcanized tread strip as set forth in claim 2, wherein the minimum thickness of the wing is at the longitudinal groove.

4. A prevulcanized tread strip as set forth in claim 2, wherein the maximum thickness of the bead is greater than or equal to twice the minimum thickness of the wing at the longitudinal groove.

5. A prevulcanized tread strip as set forth in claim 2, wherein the exterior surface of the longitudinal groove is concave and has a radius greater than or equal to five times the minimum thickness of the wing.

6. A prevulcanized tread strip as set forth in claim 1, wherein the minimum thickness of the wing is less than 3 mm.

7. A prevulcanized tread strip as set forth in claim 1, wherein the lateral end of the bead in at least one wing has a transverse profile in the form of a semicircle of radius greater than or equal to the minimum thickness of the wing.

8. A prevulcanized tread strip as set forth in claim 1, wherein the lateral end of the bead in at least one wing has a substantially straight transverse profile and forms, with the transverse profile of the lateral end of the base, an angle α which measures substantially between above 90° degrees and 140°.

9. A prevulcanized tread strip as set forth in claim 8, wherein the angle a measures between 110° and 130°.

10. A prevulcanized tread strip as set forth in claim 8, wherein the transverse profile of the exterior surface of the bead is substantially straight and forms, with the substantially straight lateral end of the profile of the bead, an angle β which is less than or substantially 90°.

11. A prevulcanized tread strip as set forth in claim 1, wherein the cap is made of an elastomeric material having a composition and hardness which is substantially the same as the elastomeric material used in tread strips and the wings are made of an elastomeric material having a composition and hardness which is substantially the same as the elastomeric material used in the exterior walls of tires.

12. A tire made by assembling a carcass and a prevulcanized tread strip as set forth in claim 1.

* * * * *